UNITED STATES PATENT OFFICE.

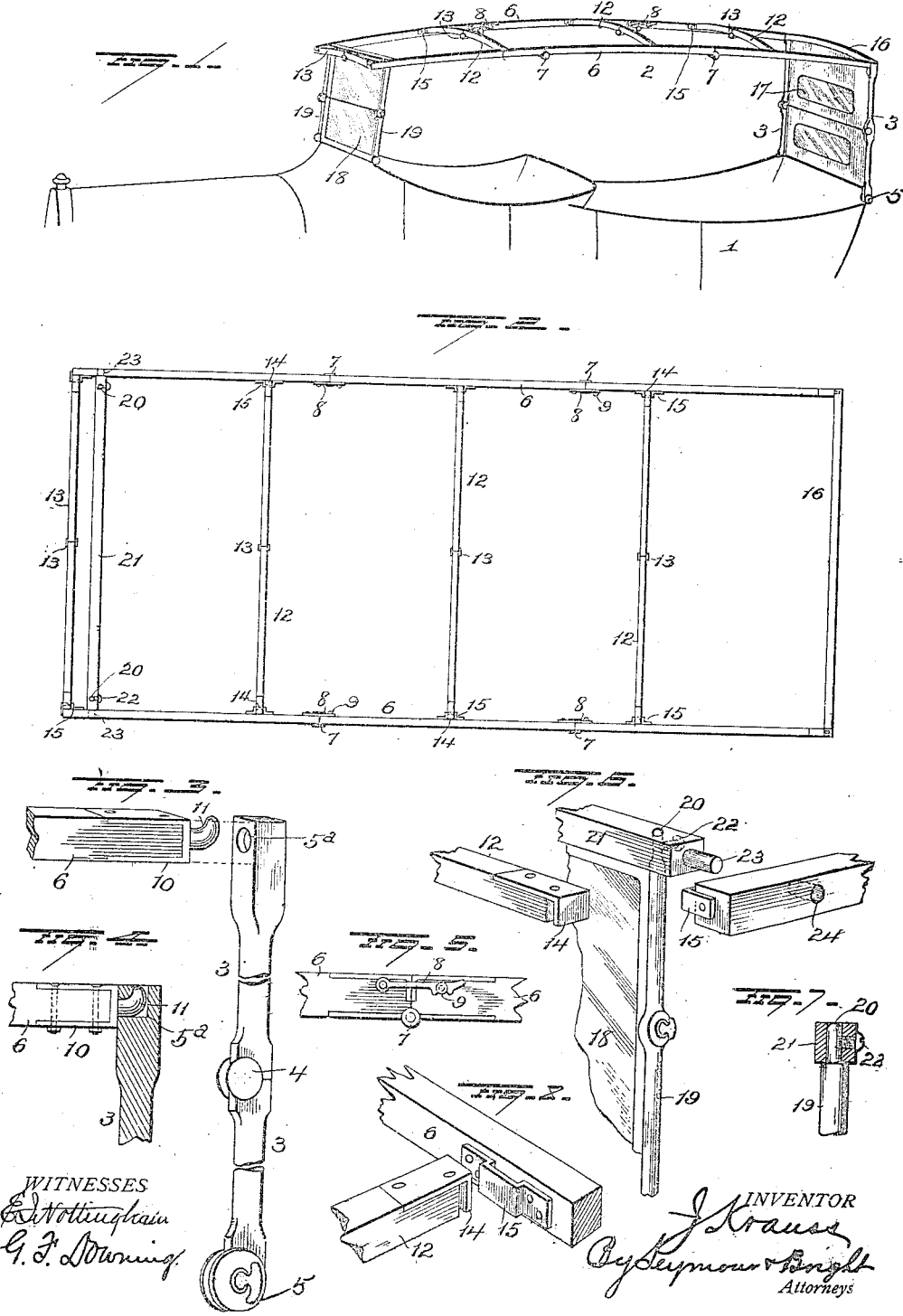

JACOB KRAUSS, OF CLEVELAND, OHIO.

TOP-FRAME FOR AUTOMOBILES.

1,294,811.  Specification of Letters Patent.  Patented Feb. 18, 1919.

Application filed December 18, 1917. Serial No. 207,688.

*To all whom it may concern:*

Be it known that I, JACOB KRAUSS, a citizen of the United States, and a resident of Cleveland, in the county of Cuyahoga and State of Ohio, have invented certain new and useful Improvements in Top-Frames for Automobiles; and I do hereby declare the following to be a full, clear, and exact description of the invention, such as will enable others skilled in the art to which it appertains to make and use the same.

This invention relates to improvements in top frames for automobiles,—the object of the invention being to provide a simple and efficient collapsible or knockdown top frame which may be quickly assembled and applied to the body of an automobile and which may be readily taken apart and compactly packed for storage.

With this and other objects in view, the invention consists in certain novel features of construction and combinations of parts as hereinafter set forth and pointed out in the claims.

In the accompanying drawings: Figure 1 is a view showing the application of my improvements to an automobile body; Fig. 2 is a plan view of the top frame, and Figs. 3, 4, 5, 6, 7 and 8 are views illustrating various details of construction.

1 represents the body of an automobile and 2 my improved frame applied thereto. This frame comprises rear end posts 3, each of which is made in sections hinged together by rule-joint connections, as indicated at 4. Each end post 3 is provided at its lower end with a clamp 5 to facilitate the attachment of the same to the body 1, and each post 3 is provided at or near its upper end with a hook-shaped socket 5ª. The top frame 2 also comprises side rails 6, each of which comprises a plurality of sections of wood or any other suitable material, connected by hinges 7 of the rule-joint type. In order to insure proper rigidity of the side rails and prevent accidental collapsing of the same, latches 8 may be employed, each of said latches being pivoted to the inner face of one side rail section and engaging a pin 9 on the adjacent section.

The rear sections of the side rails have secured thereto metal clips 10 from which hook-shaped lugs 11 project to enter the sockets 5ª at the upper ends of the end posts 3.

The side rails 6 are connected at intervals by cross rails 12 each comprising at least two sections connected by a rule-joint hinge 13. Each of these cross rails 12 may be made of wood or other suitable material and has secured to respective ends, hooks 14 which may be made of flat metal bent to form an angle and adapted to engage metal loops 15 secured to the inner faces of the side rails. The cross rail 16 at the rear end of the frame may be made in a single piece secured at its ends to the end posts 3 and foldable with said end posts. The end posts 3 and rear cross rail 16 constitutes an end frame to which rear end curtains 17 may be attached. The side rails 6 and cross rails 12 constitute supporting means for side and roof curtains, not shown.

The forward ends of the side rails 6 are supported by the frame of the wind shield 18,—said frame comprising posts 19 having tenons 20 at their upper ends to enter sockets in a cross rail 21,—the parts being held firmly together by means of set screws 22. The cross rail 21 is provided at its respective ends with tenons 23 to enter sockets 24 located in the side rails 6 rearwardly of the forward cross rail 12.

My improvements provide a top frame which is simple and substantial in construction; which can be quickly assembled, and which can be readily collapsed and folded into small space.

Slight changes might be made in the details of construction of my invention without departing from the spirit thereof or limiting its scope and hence I do not wish to restrict myself to the precise details herein set forth.

Having fully described my invention what I claim as new and desire to secure by Letters Patent, is:—

1. A top frame comprising end posts made in sections hinged together, the upper sections having sockets, sectional side rails, hook-shaped lugs carried by said side rails and adapted to enter the sockets of the end posts, collapsible cross rails, hooks at the ends of said cross rails, and loops on the side rails to receive said hooks.

2. A top frame comprising side rails, rear end posts, means removably connecting the side rails with the rear end posts, a wind shield frame comprising posts having tenons and a cross rail having sockets to receive said tenons, and tenons on the ends of said cross rail of the wind shield frame, said side rails having sockets to receive said last-mentioned tenons.

In testimony whereof I have signed this specification in the presence of two subscribing witnesses.

JACOB KRAUSS.

Witnesses:
J. C. PARCK,
JESSIE T. WAKEMAN.